(12) United States Patent
Chin et al.

(10) Patent No.: US 10,143,094 B2
(45) Date of Patent: Nov. 27, 2018

(54) PLATE-TYPE OPTICAL MEMBER WITH OPTICAL FIBER AND MULTI-PANEL DISPLAY DEVICE WITH THE SAME

(71) Applicant: LG Display Co., Ltd., Seoul (KR)

(72) Inventors: MiHyung Chin, Paju-si (KR); JeongMin Moon, Goyang-si (KR); SeungSoo Yang, Paju-si (KR); Bora Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/145,778

(22) Filed: May 3, 2016

(65) Prior Publication Data

US 2017/0094815 A1 Mar. 30, 2017

(30) Foreign Application Priority Data

Sep. 25, 2015 (KR) ........................ 10-2015-0136730

(51) Int. Cl.
| | |
|---|---|
| *G02B 6/08* | (2006.01) |
| *G02F 1/1335* | (2006.01) |
| *G02F 1/1333* | (2006.01) |
| *H05K 5/00* | (2006.01) |
| *G02B 6/02* | (2006.01) |
| *G02B 6/06* | (2006.01) |

(Continued)

(52) U.S. Cl.
CPC ............ *H05K 5/0017* (2013.01); *G02B 6/00* (2013.01); *G02B 6/02052* (2013.01); *G02B 6/06* (2013.01); *G02B 6/08* (2013.01); *G02F 1/13336* (2013.01); *G02F 1/133524* (2013.01); *B29D 11/00721* (2013.01); *B29K 2101/12* (2013.01); *B29K 2105/253* (2013.01); *B29K 2995/0031* (2013.01); *C03B 23/0013* (2013.01)

(58) Field of Classification Search
CPC ........................... G02B 6/08; G02F 1/133524
See application file for complete search history.

(56) References Cited

U.S. PATENT DOCUMENTS

| | | | | |
|---|---|---|---|---|
| 5,465,315 | A * | 11/1995 | Sakai | G02B 6/06 385/116 |
| 2006/0007054 | A1* | 1/2006 | Chang | G02F 1/13336 345/1.3 |
| 2015/0093086 | A1* | 4/2015 | Wu | G02B 6/08 385/132 |

FOREIGN PATENT DOCUMENTS

| | | |
|---|---|---|
| CN | 103412424 A | 11/2013 |
| JP | 60169833 A * | 9/1985 ......... G02F 1/13336 |

(Continued)

OTHER PUBLICATIONS

European Extended Search Report, European Application No. 16181414.0, dated Feb. 17, 2017, 8 pages.

*Primary Examiner* — Omar R Rojas
(74) *Attorney, Agent, or Firm* — Fenwick & West LLP

(57) ABSTRACT

In a plate-type optical member for a multi-panel display device in which a plurality of individual display devices are joined and which includes junction area in which non-active areas of the individual display devices are arranged, the plate-type optical member includes plural optical fibers that have input ends opened to the lower part of the plate-type optical member and output ends opened to the upper part of the plate-type optical member and a resin support that supports the optical fibers. It is possible to guarantee image continuity in panel junction areas by disposing the plate-type optical member on the front surface of the multi-panel display device.

20 Claims, 13 Drawing Sheets

(51) Int. Cl.
  *G02B 6/00* (2006.01)
  *B29D 11/00* (2006.01)
  *B29K 101/12* (2006.01)
  *B29K 105/00* (2006.01)
  *C03B 23/00* (2006.01)

(56) References Cited

FOREIGN PATENT DOCUMENTS

| JP | S 60-169833 | 9/1985 |
| JP | S 61-185785 | 8/1986 |
| JP | 2001-042777 A | 2/2001 |
| WO | WO 02/056071 A2 | 7/2002 |

\* cited by examiner

*FIG.6*
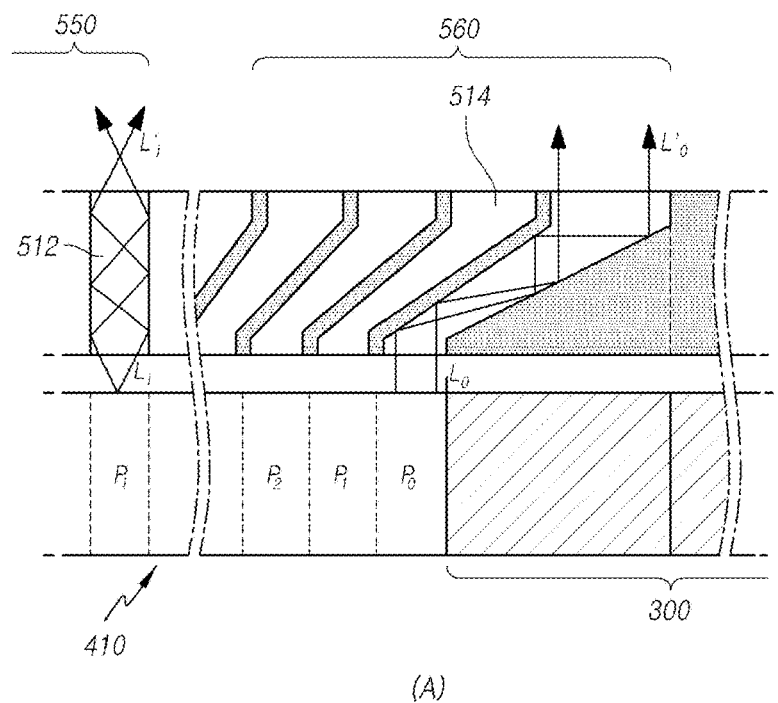
(A)
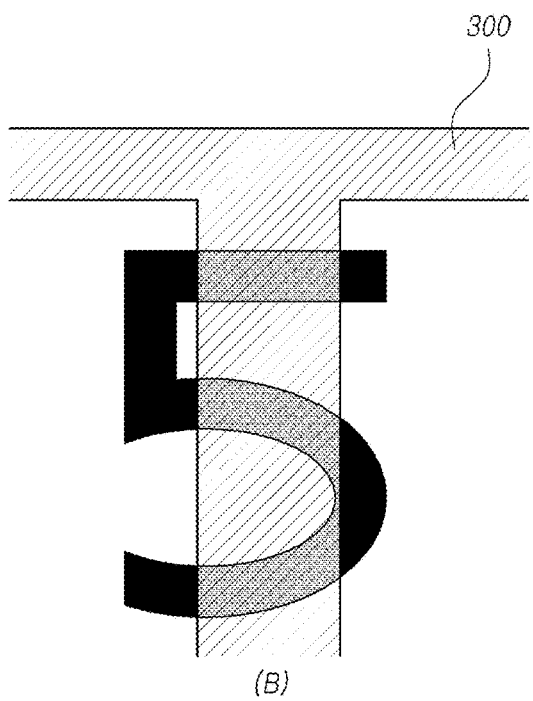
(B)

PLATE-TYPE OPTICAL MEMBER WITH OPTICAL FIBER AND MULTI-PANEL DISPLAY DEVICE WITH THE SAME

CROSS REFERENCE TO RELATED APPLICATION

This application claims priority from and the benefit under the benefit under 35 U.S.C. § 119(a) of Republic of Korea Patent Application Number 10-2015-0136730 filed on Sep. 25, 2015, which is hereby incorporated by reference for all purposes as if fully set forth herein.

BACKGROUND OF THE INVENTION

Field of the Invention

Embodiments of the present invention relate to a multi-panel display device in which plural individual display devices are joined to form a single large-scale image output device.

Discussion of the Related Art

With progress of information society, there is more need for a display device displaying images in various forms and various display devices. The display devices include liquid crystal display devices, plasma display devices, and organic light emitting display devices.

There is a need for a large-size display device for the commercial purposes. However, the size of a display panel constituting a display device is currently restricted. Hence, a multi-panel display device in which plural individual display panels or display devices are joined to display a single large image has been used as a large-scale display device. Such a multi-panel display device is referred to as a video wall.

Each of the individual display panel or display devices constituting such a multi-panel display device includes a central active area in which an image is displayed and a non-active area which is disposed around the active area and in which an image is not displayed. The non-active area has a frame shape with a constant width to surround an edge of the display panel. Such non-active area is referred to as a bezel area. The non-active area or the bezel area is an indispensable part that includes gate driving circuit, a data driving circuit, and various signals lines for driving the display panel.

SUMMARY OF THE INVENTION

Embodiments relate to a multi-panel display device including a plurality of individual display devices and an optical member on the plurality of individual display device. The plurality of individual display devices adjoin along junction lines. The optical member has a flat profile of a thickness smaller than a length or a height of an individual display device. The optical member includes a plurality of light conduits of a first refractive index and cladding portions surrounding the light conduits. The cladding portions have a second refractive index lower than the first refractive index. The light conduits include input surfaces receiving lights from active areas of the display devices and output surfaces transmitting the received light.

In one embodiment, a subset of the light conduits have output surfaces shifted towards the junction lines relative to input surfaces of the subset of the light conduits to transmit light over non-active areas of the display devices.

In one embodiment, the input surfaces and the output surfaces are parallel.

In one embodiment, the optical member includes a first area and a second area between the first area and a junction line. First light conduits in the first area extending straight in a thickness direction of the optical member. Second light conduits in the second area have at least one wall slanted towards the junction lines.

In one embodiment, an input surface of each of the first light conduits has a same area as an output surface of each of the first light conduits. An input surface of each of the second light conduits has an area smaller than an output surface of each of the second light conduits.

In one embodiment, a first output surface of a second light conduit closer to a junction line than a second output surface of another second light conduit has an area larger than the second output surface.

In one embodiment, the multi-panel display device further includes supporting material surrounding and supporting the light conduits and the cladding portions. The supporting material has a third refractive index lower than the first refractive index and the second refractive index.

In one embodiment, the light conduits and the cladding portions are light fibers.

In one embodiment, each of the light conduits have a cross section shape of a convex polygon.

In one embodiment, the cladding portions include black beads configured to absorb lights transmitted via the cladding portions.

Embodiments also relate to an optical member for multi-panel display device. The optical member includes a plurality of light conduits and cladding portions. The light conduits has a first refractive index, the light conduits includes input surfaces receiving lights from active areas of display devices and output surfaces transmitting the received light. A subset of the light conduits having output surfaces shifted towards the junction lines relative to input surfaces of the subset of the light conduits to transmit light over non-active areas of the display devices. Cladding portions have a second refractive index lower than the first refractive index. The cladding portions surround the plurality of light conduits.

Embodiments also relate to a method of manufacturing an optical member for placing on a plurality of individual display devices. A plurality of optical fibers are bundled into a block. The block of optical fibers is heated. The block of heated optical fibers at both sides of the block to shape the block into the optical member. At least a subset of the optical fibers in the optical member of input surfaces of area smaller than output surfaces. The input surfaces receive lights from active areas of the display devices and the output surfaces transmit the received light. The optical member is cooled to solidify the shape of the optical member.

In one embodiment, resin holds the optical fibers in the block.

In one embodiment, the output surfaces of the subset of the optical fibers are shifted towards junction lines of the display devices relative to the input surfaces of the subset of the optical fibers to transmit light over non-active areas of the display devices.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 6 is a diagram illustrating optical paths in which lights transmitted from the pixels propagate through optical fibers included in the plate-type optical member according to this embodiment to the outside of the plate-type optical member;

DETAILED DESCRIPTION OF THE INVENTION

Figure 1:
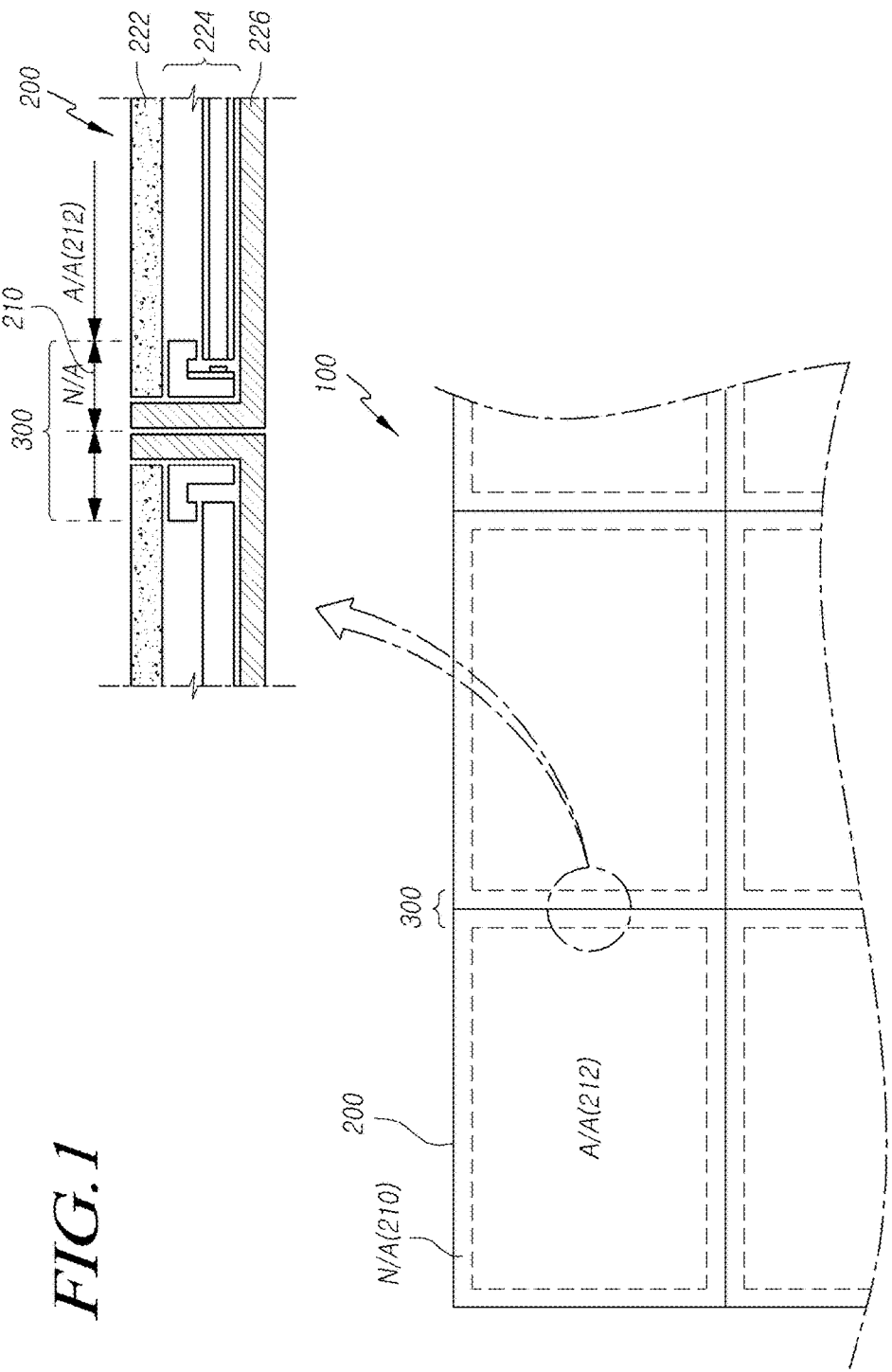
FIG. 1 illustrates a plan view of a multi-panel display device according to an embodiment of the present invention and an enlarged cross-sectional view of a panel junction area of the multi-panel display device.

Hereinafter, some embodiments of the present invention will be described in details with reference to the accompanying drawings. In describing the invention with reference to the accompanying drawings, like elements are referenced by like reference numerals or signs regardless of the drawing numbers. When it is determined that detailed description of known techniques involved in the invention makes the gist of the invention obscure, the detailed description thereof will not be made.

Terms such as first, second, A, B, (a), and (b) can be used to describe elements of the invention. These terms are merely used to distinguish one element from another element and the essence, order, sequence, number, or the like of the elements is not limited to the terms. If it is mentioned that an element is "coupled" or "connected" to another element, it should be understood that the element is directly coupled or connected to another element or still another element is "interposed" therebetween or the elements may be "coupled" or "connected" to each other with still another element interposed therebetween.

FIG. 1 illustrates a multi-panel display device according to an embodiment and illustrates a plan view of the multi-panel display device and an enlarged cross-sectional view of a panel junction area of the multi-panel display device. Referring to FIG. 1, a general multi-panel display device 100 is formed by adjoining plural individual display devices 200. The multi-panel display device 100 includes junction areas 300 where the individual display devices 200 are adjoined.

Each individual display device 200 independently serves as a separate and fully functional display device and can be embodied, for example, as a liquid crystal display device (LCD), an organic light-emitting display device (OLED), or the like.

An individual display device described herein refers to a single display device constituting a multi-panel display device and may be also be referred to herein as an individual panel or a panel.

As illustrated in FIG. 1, each individual display device 200 includes an active area (A/A) 212 which refers to the center of a panel and in which an image is displayed, and a non-active area (N/A) 210 which refers to the edge of the panel surrounding the active area and in which an image is not displayed. The non-active area 210 of the individual display device 200 is also referred to as a bezel area.

On the other hand, each individual display device 200 may include a display panel 222, a backlight unit 224 that is disposed below the display panel to supply light to the display panel, and a support structure 226 that surrounds the entire display device.

The display panel 222 is manufactured by bonding a first substrate which is an array substrate. Thin film transistors and the like are formed in the first substrate. A pixel area is defined in a second substrate which is an upper substrate formed with a black matrix and/or a color filter layer and the like. In case of a panel based on an OLED display device, the second substrate may serve as only a protective substrate.

The backlight units 224 may include subunits such as a light source module including a light source such as an LED, a holder fixing the light source, and a light source driving circuit, a light guide plate (LGP) or a diffusion plate that diffuses light to the entire panel area, a reflective plate that reflects light to the display panel, an LED flexible circuit which is a circuit for controlling ON/OFF of the light source and the like, and one or more optical films or sheets that are disposed on the light guide plate for improvement in luminance, diffusion of light, protection, and the like.

An outer support member 226 covering the display device may be a cover bottom and/or a guide panel surrounding and protecting the backlight unit 224 and the display panel 222 as a unit of each display device, a back cover as a unit of a set electronic device which is a final electronic product including display devices, or the like.

On the other hand, as illustrated in FIG. 1, each individual display device 200 includes a non-active area (N/A) 210 at its predetermined edge area where images are not displayed. Since the multi-panel display device is formed by joining plural individual display devices 200, an image is not displayed in junction areas 300 in which the individual display devices are joined in the multiple display panels.

On the other hand, the non-active area (N/A) 210 of each individual display device 200 can be formed by a non-active area of the display panel 222 itself, an area covered by the backlight unit 224 or the like, a case top or a front cover covering the entire surface of the display device, and the like.

Therefore, when a signal image is displayed on the multi-panel display device or the video wall illustrated in FIG. 1, image discontinuity in which an image is not displayed occurs in the junction areas 300.

Figure 2:
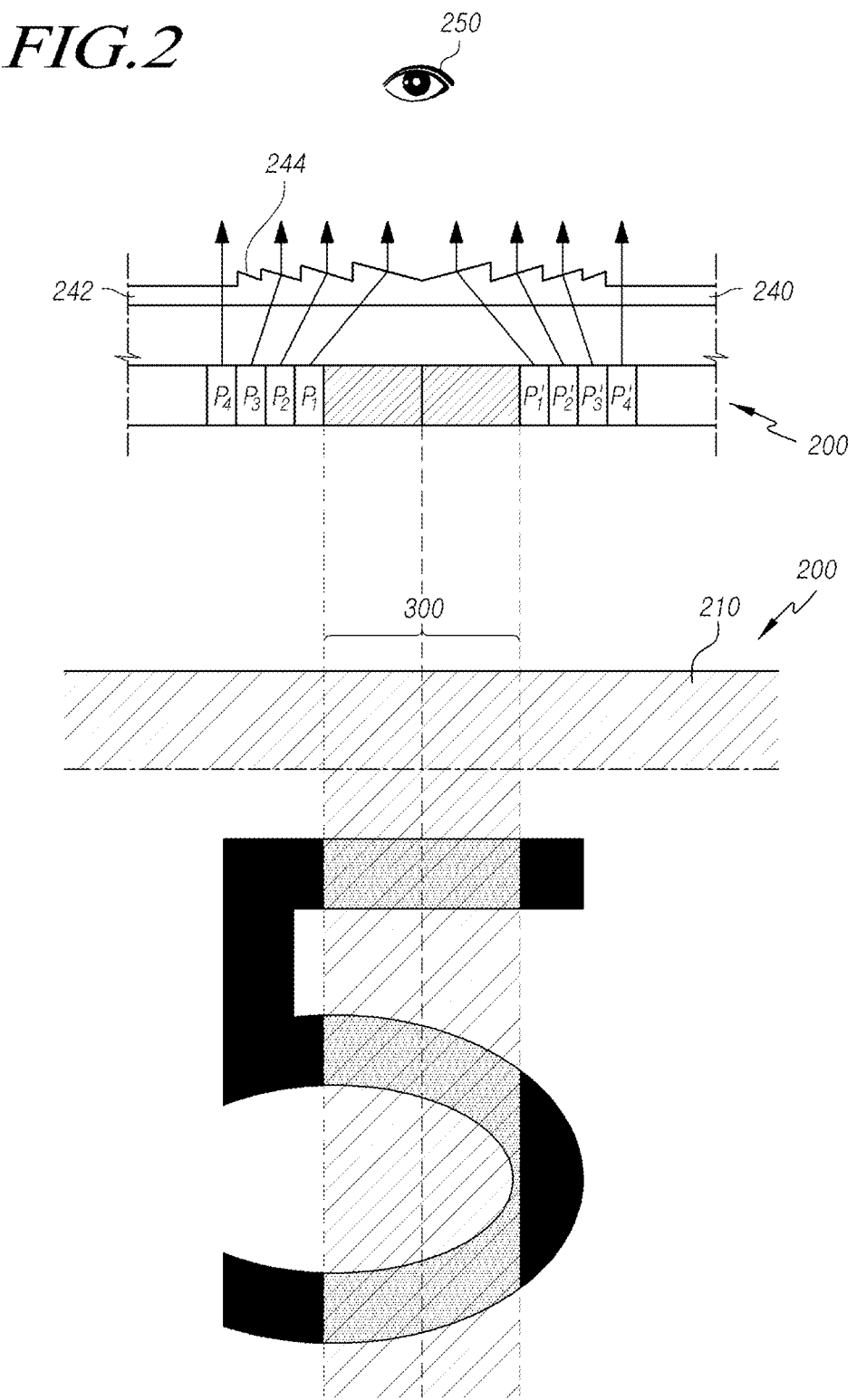
FIG. 2 is a diagram illustrating image discontinuity occurring in junction areas of individual display devices of a multi-panel display device according to the related art.

FIG. 2 illustrates an example of a refractive optical member that enlarges and displays the junction areas of the multi-panel display device and an image in the front viewing field when the refractive optical member is used. As illustrated in FIG. 2, one way of solving the phenomenon of image discontinuity in the junction areas of the multi-panel display device is to use a technique where a refractive optical member is disposed on the multi-panel display device so as to refract or enlarge an optical path in the vicinity of the junction areas.

FIG. 2 illustrates a configuration in which a lens plate disposed on the multi-panel display device is used as such a refractive optical member. The lens plate 240 which is the refractive optical member illustrated in FIG. 2 is a type of light-transmitting screen and includes a base plate 242 which is a general light-transmitting panel material having a predetermined thickness and a lens unit formed in the vicinity of the junction area 300 of the multi-panel display device.

The lens unit 244 formed in the lens plate 240 is used to refract an optical path in the vicinity of the junction area 300 and a Fresnel lens or the like can be used, but the lens unit is not limited to the Fresnel lens.

When a user is placed in front of the junction area 300 as illustrated in FIG. 2, light from pixels P1 to P4 in the neighboring active area is refracted and is incident on the user's viewing field by the lens unit 244 of the lens plate 240 formed on the junction areas of the multi-panel display device. When a user watches the multi-panel display device from the front side, images of neighboring pixels are refracted and projected to the junction areas 300 to display a predetermined image as illustrated in the lower part of FIG. 2. Accordingly, the image discontinuity in the panel junction area is compensated for to a certain extent.

Figure 3:
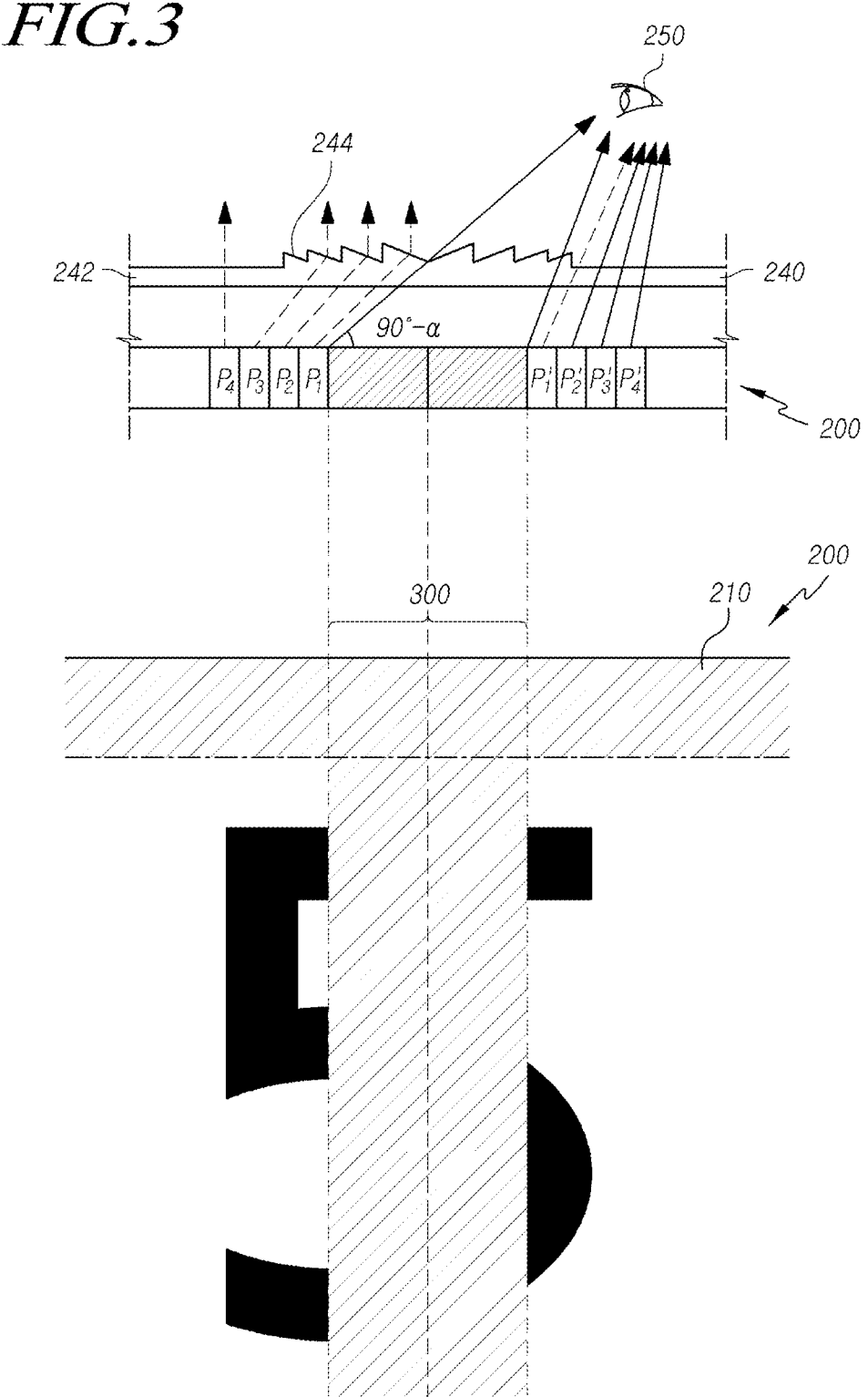
FIG. 3 is a diagram illustrating image discontinuity occurring in the refractive optical member of FIG. 2 when a viewing angle is equal to or greater than a predetermined angle.

In these attempts using Fresnel lens plate, to solve image discontinuity in the panel junction area is advantageously prevented when viewed from the front. However, when a user's viewing angle departs from the front side (with a viewing angle of 0 degrees) and is equal to or greater than about 45 degrees (α), the optical path illustrated in FIG. 2 is not formed and the panel junction area 300 is exposed. That is, as illustrated in FIG. 3, when the viewing angle is α (α>about 45 degrees), some light from the pixels in the vicinity of the junction area is not incident on a user obliquely watching the multi-panel display device and thus bezels of the individual display devices are exposed. Therefore, the phenomenon of image discontinuity in the panel junction area occurs as illustrated in the lower part of FIG. 3.

Embodiments of the present invention compensates for the phenomenon of image discontinuity occurring in the junction areas of the multi-panel display device even at a viewing angle equal to or greater than a predetermined angle. In the embodiments of the present invention, in order to provide a seamless image in the junction areas of the individual display devices at a front viewing angle and a high viewing angle in a multi-panel display device in which plural individual display devices are joined, a plate-type optical member including plural optical fibers and resin supports supporting the optical fibers is disposed on the multi-panel display device to output an image to the non-active area via output ends of the optical fibers.

Hereinafter, detailed configurations of a plate-type optical member according to the embodiments of the present invention and the multi-panel display device having the plate-type optical member will be described with reference to FIG. 4A through FIG. 11C.

Figure 4A:
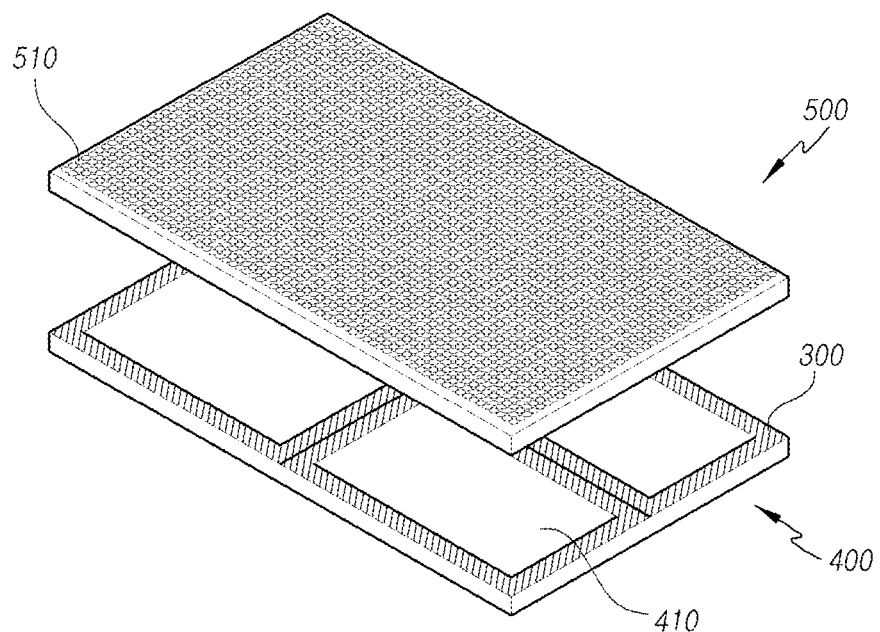
FIGS. 4A and 4B are a perspective view and a schematic cross-sectional view of a multi-panel display device including a plate-type optical member including optical fibers according to an embodiment.
Figure 4B:
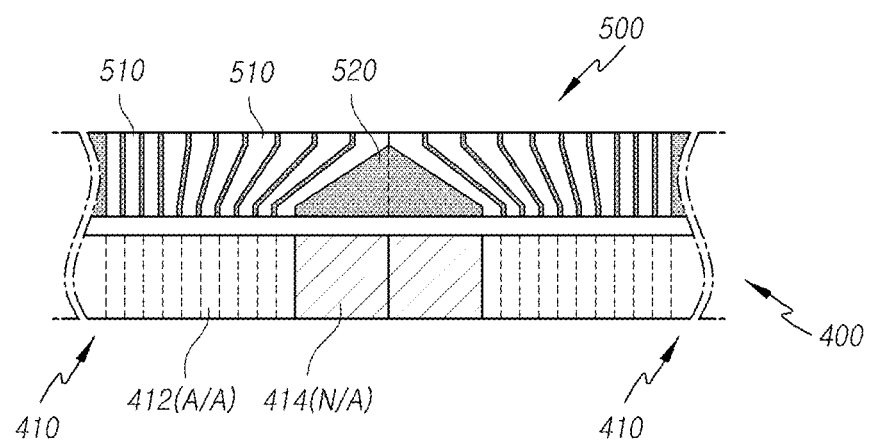

FIGS. 4A and 4B are a perspective view and a schematic cross-sectional view of a multi-panel display device including a plate-type optical member including optical fibers according to an embodiment. As illustrated in FIGS. 4A and 4B, a multi-panel display device according to an embodiment may include a display panel section 400 that is formed by joining plural individual display devices and includes junction areas in which non-active areas of the individual display devices are joined, and a plate-type optical member 500 that includes plural optical fibers 510 and a resin support 520 which is disposed between the optical fibers and supports and bind the optical fibers. The display panel section 400 also includes active areas 412 displaying images.

The plate-type optical member 500 is a plate-type member that includes plural optical fibers 510 which have input ends (e.g., 722 and 742 of FIG. 7) opened to the lower part of the plate-type optical member, output ends (e.g., 724 and 744 of FIG. 7) opened to the upper part of the plate-type optical member and the resin support 520 which supports the optical fibers. The optical fibers 500 have optical transmission properties.

As described herein, the bottom part of the plate-type optical device is a surface facing the display panel section 400, and the top part of the plate-type optical device is an image display surface in which images are output via the optical fibers. The display panel section 400 of the multi-panel display device according to the embodiments of the present invention corresponds to a display unit of a multi-panel display device that displays an image by joining individual display devices 410. In boundary areas at which the individual display devices are joined, bezel areas or non-active areas (NA) 414 of the individual display device are joined to form areas in which images are not displayed. As described herein, boundary areas in which the individual display devices are joined are referred to as junction areas 300.

Therefore, the junction areas 300 of the multi-panel display device are non-active areas that are formed in the shape of the lattice in the entire multi-panel display device, and the width of each junction area 300 is double the width of the non-active area 414 of each individual display device 410.

In these junction areas 300, discontinuity of an image occurs. As described below in detail, embodiments relate to transmitting output images from the pixels of an active area to the top area of an optical member via optical fibers included in a plate-type optical member, the top area including areas which correspond to the junction areas. A detailed configuration of this optical fiber and a solution to the image discontinuity phenomenon are described in detail as follows.

An individual display device 410 which can be used with the present invention may be a liquid crystal display device, but is not limited thereto, and include all forms of display device such as a plasma display device (PDP), an organic light emitting diode (OLED) display device, and the like.

Further, the individual display device 410 that is applied in the embodiment of the present invention may include a display panel with pixels, and a panel support structure such as a cover bottom. The panel support structure supports the display panel. The individual display device 410 may be a module that is comprised of only a simple display panel and a driving circuit for driving the display panel, and the support structure such as a case may be formed with the entire multi-panel display device as a unit.

That is, the individual display device described herein can independently function as a complete display device, and may include a display panel that includes an array substrate, a upper substrate, and a display material layer (liquid crystal material, organic light emitting material or the like) which is disposed between the array substrate and the upper substrate, a driving circuit unit for driving the display panel, and the like, but may exclude the support structure such as a bottom cover.

When the individual display device 410 is a liquid crystal display device, the display panel is a liquid crystal panel, and may further include a backlight unit that is arranged in the lower part of the liquid crystal panel and supplies light to the liquid crystal panel.

On the other hand, when the individual display device 410 is a liquid crystal display device, the liquid crystal display panel may include an array substrate that includes plural gate lines, plural data lines, plural pixels defined by areas in which the gate lines and the data lines are crossed, and a thin film transistor TFT that serves as a switching device for controlling light transmittance in each pixel, a upper substrate that includes a color filter and/or black matrix and the like, and a liquid crystal material layer that is formed between the array substrate and the upper substrate. A touch window may be further arranged on the entire top surface of the display panel.

When the individual display device applied in the embodiments of the present invention is an organic light emitting diode (OLED) display device, the display panel may be comprised of an array substrate and a upper protective substrate, the array substrate including gate lines, data lines, pixels defined by areas in which the gate lines and the data lines are crossed, and a thin film transistor TFT which serves a switching device for selectively applying electric signals to an organic field emission material layer.

Figure 5:
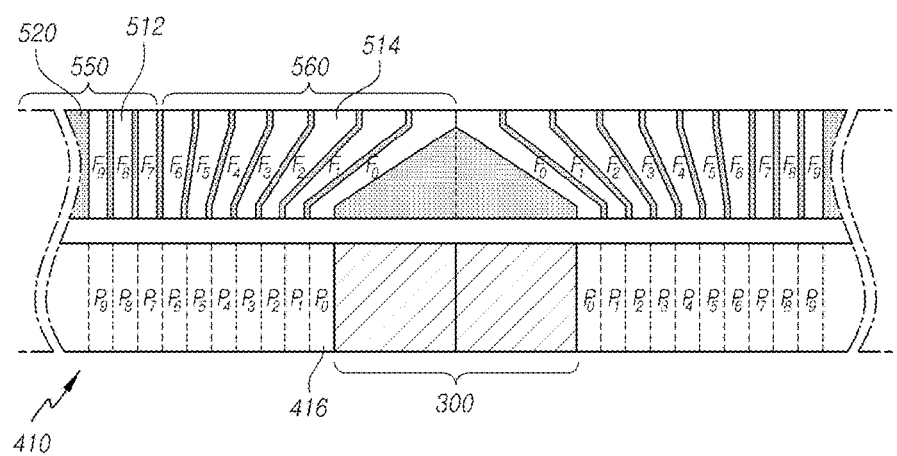
FIG. 5 is an enlarged cross-sectional view of the plate-type optical member according to the embodiment where an arrangement relationship between the plate-type optical member and pixels of the individual display devices is illustrated.

FIG. 5 is an enlarged cross-sectional view of the plate-type optical member according to an embodiment. FIG. 5 illustrates an arrangement relationship between the plate-type optical member and pixels of the individual display devices.

Figure 7A:
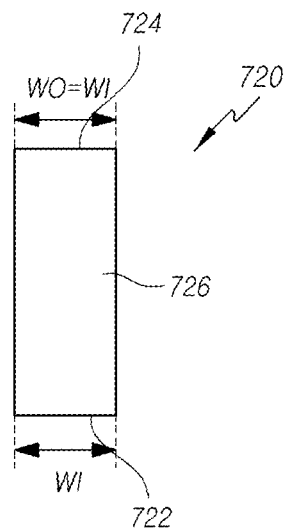
FIG. 7A is a diagram illustrating a first optical fiber arranged in the central area of the individual display device, according to one embodiment.
Figure 7B:
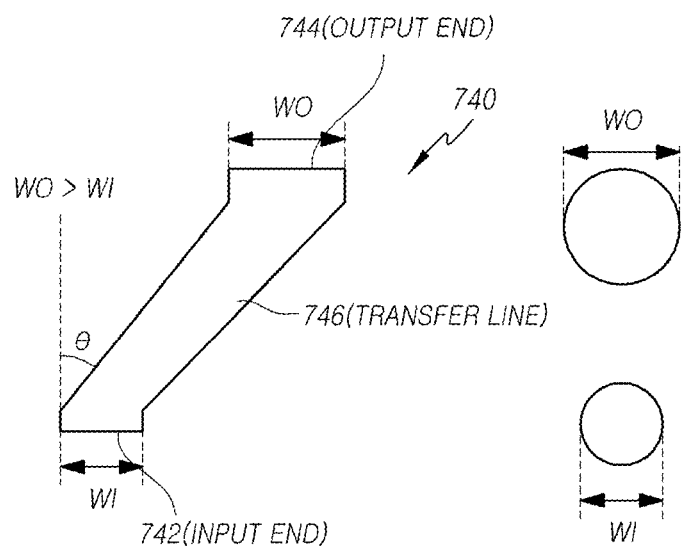
FIG. 7B is a diagram illustrating a second optical fiber arranged in the edge area including a bezel area of the individual display device, according to one embodiment.

FIGS. 7A and 7B are diagrams illustrating optical fibers that are included in the plate-type optical member according to this embodiment. Specifically, FIG. 7A illustrates the first optical fiber arranged in the central area of the individual display device and FIG. 7B illustrates the second optical fiber arranged in the edge area including a bezel area of the individual display device.

As illustrated in FIGS. 5, 7A and 7B, optical fibers 512 and 514 used in the plate-type optical member 500 according to this embodiment are optical fibers that extend in the direction of the thickness of the plate-type optical member 500. Each optical fiber includes an input end at its lower part, an output end at its upper part, and a transfer line that is placed between the input end and the output end to transfer light.

Since the optical fibers 512 and 514 have input ends that are arranged to correspond to pixel areas of the individual display devices arranged below the plate-type optical member, the optical fibers receive lights from the corresponding pixels through the input ends and output the lights through the output ends by total reflection. As a result, pixel images of the individual display device can be imaged on the top surface of the plate-type optical member 500.

The optical fibers 512 and 514 included in the plate-type optical member include one or more core portions provided in the center and a cladding portion surrounding the core portions, as described below in detail with reference to FIGS. 11A through 11C. Since a refractive index of the core portions is larger than a refractive index of the cladding portion, the optical fibers can transfer light inputted through the input ends to the output ends by total reflection.

The plate-type optical member 500 according to this embodiment includes a first area 550 corresponding to the center area of the individual display device and a second area 560 corresponding to the edge area including at least non-active areas of the individual display device. In the plate-type optical member, first optical fibers 512 are arranged in the first area 550, and second optical fibers 514 having configurations different from those of the first fibers 512 are arranged in the second area 560.

Figure 8:
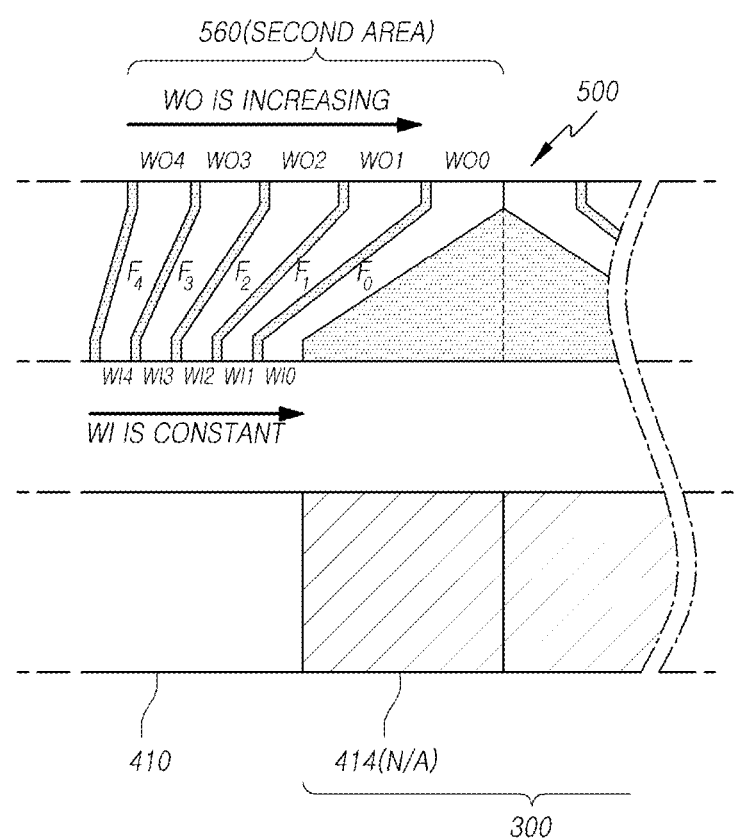
FIG. 8 is a cross-sectional view illustrating the sizes and arrangement of input ends and output ends of the second optical fibers according to a first embodiment.

According to the embodiments of FIGS. 5 and 8, the first optical fibers 512 arranged in the first area 550 of the plate-type optical member are straight line type optical fibers that have input ends and output ends having the same size, and thus transfer corresponding images to the top of the plate-type optical member as they are without magnification.

Accordingly, the optical fibers F7, F8, and F9 included in the first optical fibers 512 of FIG. 5 have input ends and output ends having the same size, and transfer images from the pixels P7, P8, and P9 of the individual display device that are arranged below the optical fibers F7, F8, and F9, respectively, to the top without magnification.

On the other hand, the second optical fibers 514 arranged in the second area 550 of the plate-type optical member are bent-type optical fibers, each having an output end larger than an input end, and thus transfer images of corresponding pixels to the top of the plate-type optical member with magnification. For this purpose, the input ends and the output ends of the second optical fibers 514 are not aligned in a line. That is, the input ends are arranged to correspond to some pixels of the edge of the individual display device, but the output ends are arranged to be offset to the outer edge relative to the input ends. As a result, the second optical fibers 514 have bent-type configurations inclined to the junction areas 500

That is, the input ends of the optical fibers F0 to F6 included in the second optical fibers 514 of FIG. 5 are arranged on the corresponding pixels P0 to P6 of the individual display device, but the output ends of the second optical fibers F0 to F6 are arranged toward the outer edge relative to the input ends.

The sizes of the input ends of the second optical fibers 514, which correspond to the pixels of the individual display device, may be the same. However, as it will be described with reference to FIGS. 9 to 10, sizes of the output ends of the second optical fibers 514 may be equal to or larger than the sizes of the input ends.

FIGS. 7A and 7B are diagrams illustrating optical fibers that are included in the plate-type optical member according to this embodiment, FIG. 7A illustrating the first optical fiber and FIG. 7B illustrating the second optical fiber.

As illustrated in FIG. 7A, the first optical fiber 720 is arranged in the first area 550 of the plate-type optical member, and is comprised of an input end 722, an output end 724, and a transfer line 726 positioned between the input end and the output end. The size WI of the input end 722 is equal to the size WO of the output end 724. As defined herein, the sizes of the input end and the output end of the optical fiber mean cross sections of the input end and the output end.

As illustrated in FIG. 7B, the second optical fiber 740 is arranged in the second area 560 of the plate-type optical member, and includes an input end 742, an output end 744, and a transfer line 746 positioned between the input end and the output end. The size WO of the output end 744 may be larger than the size WI of the input end 742. Based on the ratio of the size WO of the output end to the size WI of the input end of the second optical fiber 740, a magnification power of an image through the optical fiber is determined.

That is, light incident on the input end 742 of the second optical fiber 740 is totally reflected and then is outputted through the output end 744 having a larger size than that of the input end. As a result, an image of the corresponding pixel can be magnified by the size ratio of the output end to the input end.

As described above, in some cases, the sizes WO of the output ends of the second optical fibers 514 may be equal to the sizes WI of the input ends, which will be described in detail with reference to FIG. 10.

Regardless of the dimensional relationship between the input end and the output end, the transfer line 746 between the input end and the output end is bent in a degree, and an angle formed by the direction of the normal line of the plate-type optical member and the transfer line 746 is represented as a first angle θ.

Therefore, as illustrated in FIG. 5, the second optical fibers 514 arranged in the second area 560 of the plate-type optical member 500 shift lights from the pixels of the individual display device to the outer edge and then output the lights. As a result, the output ends of the second optical fiber 514 can output images over the junction areas 300 of the multi-panel display device or the non-active area 414 of the individual display device.

As illustrated in FIG. 5, the plate-type optical member 500 includes the resin support structure 520 that is arranged between the first optical fibers 512 and the second optical fiber 514 to support and bind the optical fibers, where the resin support 520 may be made of thermosetting resins or UV curing resins.

Accordingly, the plate-type optical member 500 according to this embodiment can be formed by arranging the first optical fiber 512 and the second optical fiber 514, filling spaces between the optical fibers 512 and 514 with a resin material, and then curing the resin material by using heat or ultraviolet (UV).

This resin support 520 is desirable to form by using a light-transmitting resin material, but is not limited thereto.

Further, the refractive index of the resin material of the resin support structure 520 must be smaller than refractive indexes of optical fiber materials of the first optical fiber 512 and the second optical fiber 514.

FIG. 6 is a diagram illustrating optical paths in which lights transmitted from the pixels propagate through optical fibers included in the plate-type optical member according to this embodiment to the outside of the plate-type optical member.

As illustrated in FIG. 6, the first optical fiber 512 arranged in the first area 550 of the plate-type optical member 500 reflects light Li outputted from the corresponding pixel Pi of the individual display device with total internal reflection and then outputs light Li' over the plate-type optical member as it is.

Further, the second optical fiber 514 arranged in the second area 560 of the plate-type optical member 500 reflects light L0 outputted from the pixel P0 arranged in the edge of the individual display device with total internal reflection and then output the light L0' over the plate-type optical member. The output ends of the second optical fibers 514 cover all of the non-active area 414 of the individual display device or the junction area 300 of the multi-panel display device.

As a result, since the junction area of the multi-panel display device is not recognized in all of the front viewing field or a viewing angle and a pixel image of the edge of the individual display device is acknowledged, it is possible to display seamless image in the multi-panel display device.

Accordingly, when the plate-type optical member according to the present invention is not used, as illustrated in FIG. 2, the junction area 300 of the multi-panel display device is recognized as black shade, and thus an image discontinuity phenomenon appears in the junction area 300.

On the other hand, when the plate-type optical member is used in the junction area 300, as illustrated in FIG. 6B, images of the neighboring pixels are transferred and then is acknowledged, so that the image discontinuity in the junction area 300 can be removed.

FIG. 8 is a diagram illustrating sizes and arrangements of input ends and output ends of second optical fibers according to a first embodiment of the present invention.

In the first embodiment illustrated in FIG. 8, there is provided a configuration in which input ends of a first optical fibers (not shown) and the second optical fibers F0 to F4 are arranged to correspond to pixels arranged in the active area of the individual display device, the sizes of the input ends of the first optical fibers and the sizes WI0 to WI4 the input ends of the second optical fibers being equal to each other, but the sizes of the output ends of the second optical fiber being larger than the sizes WIi of the input ends and increasing toward the edge of the individual display device.

That is, as illustrated in FIG. 8, the sizes WI0 to WI4 of the input ends of the second optical fibers F0 to F4 are equal to each other, but the size WO4 of the output end of the second optical fiber F4 arranged in most inner area is larger than the size WI4 of the input end and the sizes of the output ends increases toward the edge.

Therefore, according to the first embodiment of FIG. 8, the dimensional relationship of the input ends and the output ends of the second optical fiber 514 arranged in the second area 560 of the plate-type optical member 500 can be represented as a mathematical expression 1 as following:

$$WI<WO4<WO3<WO2<WO1<WO0 \qquad \text{Expression 1}$$

In the first embodiment of FIG. 8, images of pixels of the edge area of the active area of the individual display device are gradually enlarged in the second area 560 of the plate-type optical member 500. Increasing rates of sizes of the output ends of the second optical fibers 514 can be determined based on the size of the non-active area of the individual display device, the thickness of the plate-type optical member and the like. However, it is desirable that the size of the largest output end (that is, the size of the second optical fiber arranged in the most outer edge of the individual display device) is smaller than a triple size of the input end.

According to the first embodiment of FIG. 8, image magnification power of the junction area of the multi-panel display device continuously increases, so that a continuous seamless image can be displayed.

Figure 9:
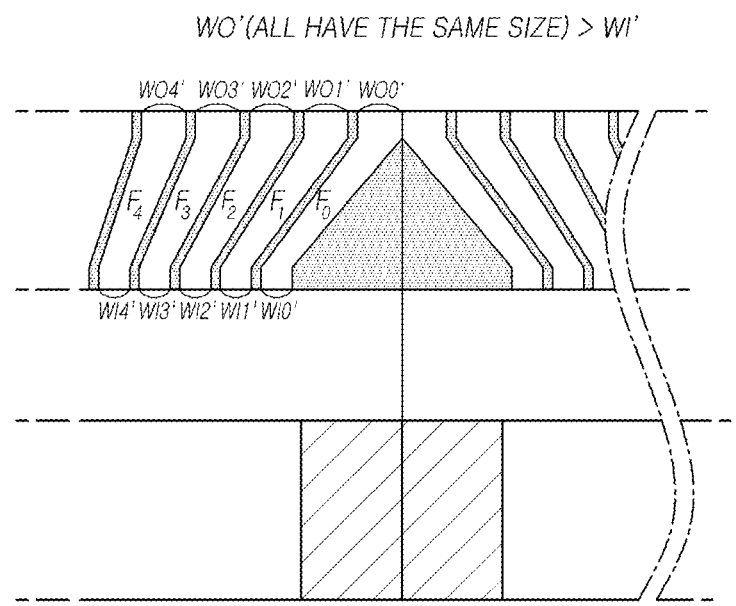
FIG. 9 is a cross-sectional view illustrating the sizes and arrangement of input ends and output ends of the second optical fibers according to a second embodiment.

FIG. 9 is a cross-sectional view illustrating the sizes and arrangement of input ends and output ends of the second optical fibers according to a second embodiment of the present invention.

The second embodiment illustrated in FIG. 9 is similar to the first embodiment of FIG. 8 in that the sizes WI0' to WI4' of the input ends of the second optical fibers are equal to the sizes of the input ends of the first optical fibers (not shown), but is different from the first embodiment in that all the sizes of the output ends of the second optical fibers are larger than the size WIi of the input ends and are equal to each other.

That is, referring to FIG. 9, the sizes WI0' to WI4' of the input ends of the second optical fibers F0 to F4 have the same value, but sizes WO0' to WO4' of the output ends of the second optical fibers F0 to F4 are also larger than the sizes of the input ends and have the same magnification power.

Accordingly, in the second embodiment of FIG. 9, the dimensional relationship of the input ends and the output ends of the second optical fiber 514 arranged in the second area 560 of the plate-type optical member 500 can be represented as a mathematical expression 2 as following:

$$WI < WO4 = WO3 = WO2 = WO1 = WO0 \quad \text{Expression 2}$$

In the second embodiment described above, magnification powers are equal to each other in the entire second area 560 of the plate-type optical member 500. Accordingly, compared to the first embodiment in which magnification powers gradually increase depending on the image type, more natural seamless image can be provided.

Like the second embodiment, when images are supplied over the non-active area by the same magnification power, it is possible to solve a problem that images are distorted due to magnification powers gradually increased toward the edge of individual display device.

Figure 10A:
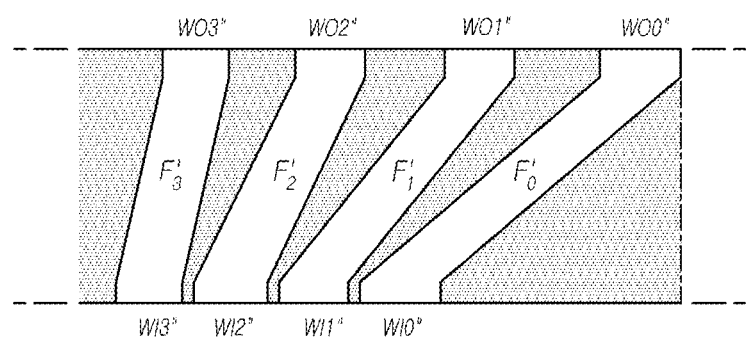
FIG. 10A is a cross-sectional view illustrating the sizes and arrangement of input ends and output ends of the second optical fibers according to a third embodiment.
Figure 10B:
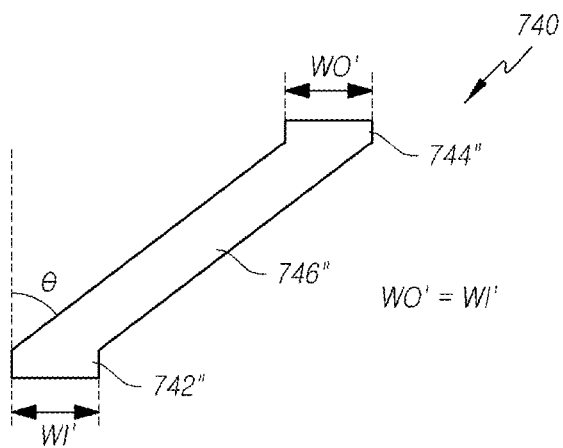
FIG. 10B is a diagram illustrating a detailed configuration of an input end and an output end of a second optical fiber.

FIG. 10A is a cross-sectional view illustrating the sizes and arrangement of input ends and output ends of the second optical fibers according to a third embodiment of the present invention, and FIG. 10B is a diagram illustrating a detailed configuration of an input end and an output end of a second optical fiber.

The third embodiment illustrated in FIG. 10A is different from the preceding embodiments in that the sizes WI0' to WI3' of the input ends of the second optical fibers are equal to the sizes of the input ends of the first optical fibers (not shown) and the sizes of the output ends WO0" to WO3" of the second optical fibers are also equal to the size WIi of the input ends.

That is, referring to FIG. 10A, all the sizes WO0" to WO3" of the output ends of the second optical fibers F0' to F3' are equal to the sizes WI0" to WI3" of the input ends of the second optical fibers F0' to F3'.

Accordingly, as illustrated in FIG. 10B, in the second optical fiber 740 according to the third embodiment, since the size WI" of the input end is equal to the size WO" of the output end, the second optical fibers are differentiated from each other based on the first angle θ formed by the direction of the normal line of the plate-type optical member 500 and the transfer line 746".

According to the third embodiment, the second optical fiber is arranged the closer to the edge of the individual display device, the first angle θ formed by the transfer line of the second optical fiber and the direction of the normal line of the plate-type optical member is the larger.

According to the third embodiment, in the same manner as the first area 550, an image of the corresponding pixel is outputted without magnification as it is in the second area 560 of the plate-type optical member 500.

Accordingly, even though resin support areas WRi that are spaces between the output ends WOi" of the second optical fibers increase toward the edge, an image distortion due to an image magnification by the optical fiber can be minimized in that a portion of an image displayed on a pixel is transferred as is. Therefore, when an individual display device has an enough resolution, with minimizing the image distortion due to magnification, seamless images can be provided by using the third embodiment.

However, the sizes WIi of the input ends and the sizes WOi of the output ends of the second optical fibers according to the embodiments of the present invention are not limited to the first to the third embodiments described above. For example, when all sizes of the output ends of the second optical fibers are equal to each other and the size of the input end is smaller than the size of the output end, the input end may have a smaller size toward the edge or have a random size.

Figure 11A:
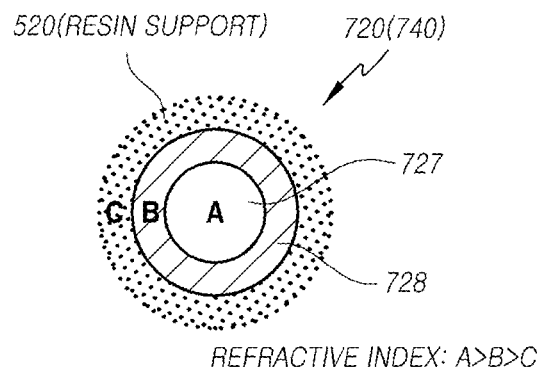
FIGS. 11A, 11B, and 11C are diagrams illustrating cross-sectional shapes of an optical fiber which can be used in the plate-type optical member according to embodiments.
Figure 11B:
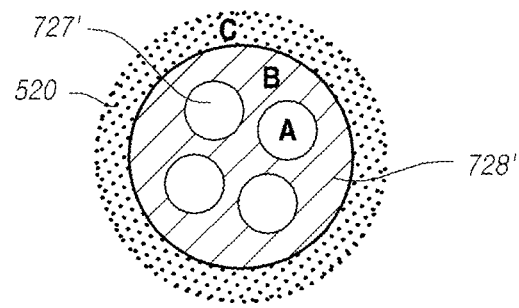
Figure 11C:
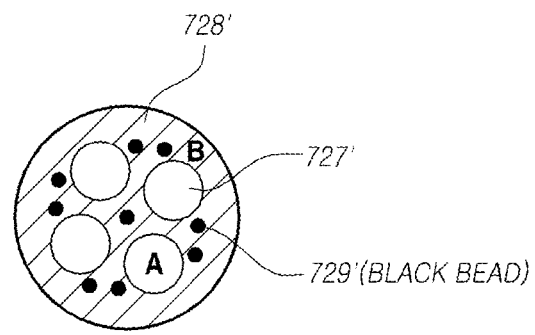
Figure 12A:
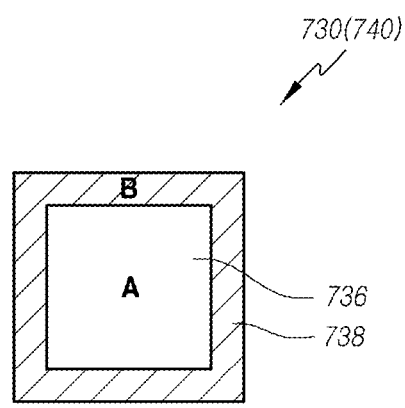
FIGS. 12A and 12B are diagrams illustrating cross-sectional shapes of an optical fiber which can be used in the plate-type optical member according embodiments.
Figure 12B:
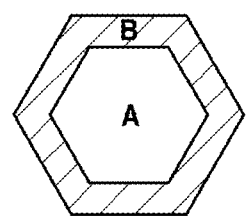

FIGS. 11A, 11B, and 11C are diagrams illustrating examples of a sectional shape of an optical fiber which can be used in the plate-type optical member according to the present invention, and FIGS. 12A and 12B are diagrams illustrating examples of a sectional shape of an optical fiber which can be used in the plate-type optical member according to the present invention. As illustrated in FIGS. 11A, 11B, and 11C, in optical fibers 720 and 740 that are used in the plate-type optical members used in these embodiments, each optical fiber may include one or more core portions 727 and a cladding portion 728 surrounding the core portions.

A refractive index A of the core portion 727 of the optical fibers 720 and 740 must be larger than the a refractive index B of the cladding portion 728, and the refractive index B of the cladding portion 728 must be larger than a refractive index C of the resin support 520.

Based on such refractive index relationship, lights that are inputted through input ends of the optical fibers 720 and 740 are totally reflected by the inner surface of the cladding portion 728, and thus propagate through only the core portion 727. Further, even though some input lights transmit the inner surface of the cladding portion 728 due to incidence angles in which lights are incident on the input end of the optical fiber, the lights are totally reflected by the resin support 520 having a smaller refractive index than that of the cladding portion and thus remain inside the cladding portion 728. As a result, light leakage to the outer edge of the optical fiber can be minimized.

As material that can be used for the optical fiber and the resin support of the plate-type optical member according to the embodiments of the present invention, a light-transmitting material such as poly-methyl methacrylate (PMMA), poly carbonate (PC), poly ether sulfone (PES), methacrylate styrene (MS), polypropylene (PP), polyethylene terephthalate (PET), acryl, silica, glass is used. Accordingly, suitable materials can be selectively used depending on the refractive index relationship described above.

For example, the polymethyl methacrylate (PMMA) material has light transmittance of about 90% and the refractive index of about 1.49 to 1.50, and the poly carbonate (PC) has light transmittance of about 86% to 89% and the refractive index of about 1.57 and more.

Further, the poly ether sulfone (PES) has light transmittance of about 73% and the refractive index of about 1.65, and the metharcylate styrene (MS) has light transmittance of about 90% and the refractive index of about 1.5677. The glass has also the refractive index of about 1.89 and more.

Accordingly, for example, when the poly ether sulfone (PES) or the glass is used as material for the core portions 727 of the first optical fiber 720 and the second optical fiber 740, the poly carbonate (PC) or the methacrylate styrene (MS) is used as material for the cladding portion 728 of the optical fiber, and the polymethyl methacrylate (PMMA) or the like is used as material for the resin support 520, it is possible to guarantee optical characteristics of the plate-type optical member 500, which is required in the present invention.

However, materials for the optical fibers are not limited to the combination of materials described above. Accordingly, once a combination of materials meets the condition that the refractive index A of the core portion 727 of the optical fibers 720 and 740 is larger than the refractive index B of the cladding portion 728 and the refractive index B of the cladding portion 728 is larger than the refractive index C of the resin support 520, all materials having light transmittance of a predetermined degree and more can be used.

As illustrated in FIGS. 11A and 11B, the optical fibers 720 and 740 may include single core portion arranged in the center area, but are not limited thereto and may be a multi-core optical fiber including a bundle of core portions therein. That is, as illustrated in FIG. 11B, the optical fiber that can be used in the plate-type optical member according to the embodiments of the present invention may be the multi-core optical fiber in which a bundle of core portions 727' are arranged in a cladding portion 728'. Accordingly, when the multi-core optical fiber is used, it is possible to increase a degree of integration per unit area of an optical transmission path.

As illustrated in FIG. 11C, the cladding portion 728' of the optical fiber may include plural black beads 739' therein. The black beads 729' absorbs noise lights that do not propagate through the core portion of the optical fiber and secede from the core portion of the optical fiber to the cladding portion or the matrix, and thus serves to decrease color mixture between neighboring optical fibers. The black beads 729' may have a refractive index different from the refractive index of the cladding portion material.

The black beads are also made of at least one of the PMMA, the Silica, and the PC that have a color of black. The black beads may have a spherical shape, a quadrangular pyramid shape, and the like, but may have an amorphous shape that is not a certain shape.

In some cases, the black beads 729' may include at least two or more beads having refractive indexes and/or sizes different from each other so as to improve optical diffusion properties and optical absorption properties. For example, a first black bead having a diameter in the range of 1 μm to 10 μm and a first refractive index and a second black bead having a diameter in the range of 20 μm to 80 μm and a second refractive index smaller than the first refractive index by 0.02 to 0.2 may be used. Here, required optical absorption properties can be obtained by regulating distribution density per unit volume.

FIGS. 12A and 12B are diagrams illustrating examples of a sectional shape of an optical fiber which can be used in the plate-type optical member according to the present invention.

As illustrated in FIGS. 11A, 11B, and 11C, the optical fibers used in the plate-type optical member according to the embodiments of the present invention may be a circular optical fiber having circular cross-section.

Since optical transmission efficiency of an optical fiber relates to the Fill Factor that is an area ratio of an area which the optical fiber occupies and a circular optical fiber having a circular cross section shows excellent optical transmission efficiency, it is desirable to use the circular optical fiber in the embodiments.

However, the embodiments are not limited to the circular optical fiber, and may use a polygonal optical fiber having a quadrangular cross section or a polygonal cross section as illustrated in FIGS. 12A and 12B.

Particularly, the optical fibers used herein may be arranged to correspond to the pixels of the individual display device that is provided below the optical fibers. Since the schematic shape of the pixel is a quadrangle, it is possible to improve a degree of matching of the input ends of the optical fibers for the corresponding pixels by using the polygonal type optical fibers illustrated in FIG. 12A or 12B.

Further, when the polygonal type optical fibers illustrated in FIGS. 12A and 12B are used, proximity between neighboring optical fibers is increased and space between the optical fibers is decreased. As a result, it is possible to improve the area ratio of optical fiber occupying areas to the entire area of the plate-type optical member.

That is, when the polygonal-type optical fibers illustrated in FIGS. 12A and 12B are used, the optical fibers can be arranged to have little space between the optical fibers, and thus an area for the resin support which does not transfer lights can be reduced. As a result, it is possible to improve an optical transmission efficiency of the entire plate-type optical member.

Figure 13A:
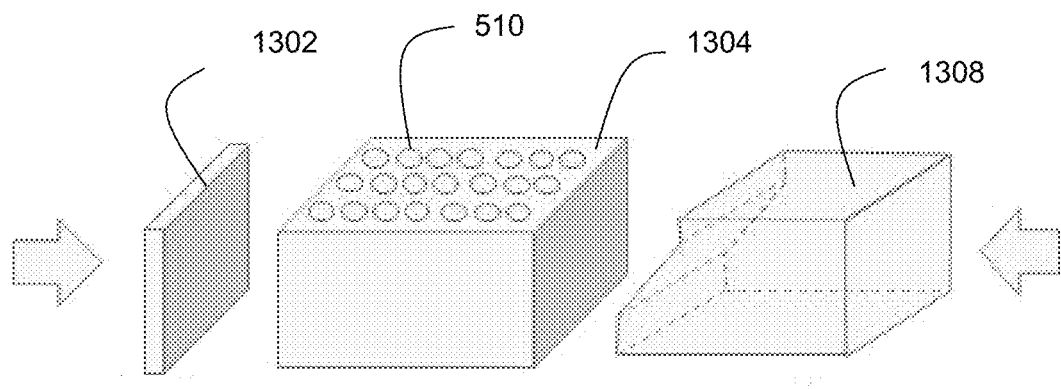
FIG. 13A is a diagram illustrating a method of manufacturing a plate-type optical member, according to one embodiment.

FIG. 13A is a diagram illustrating a method of manufacturing the plate-type optical member 500, according to one embodiment. Optical fibers 510 and resin 1304 are bundled into a block. Then the block is heated to a temperature where plastic deformation may occur in the optical fibers 510 and the resin 1304.

Figure 13B:
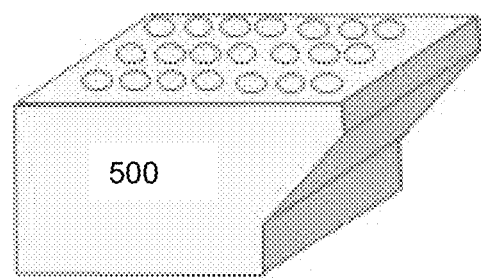
FIG. 13B is a diagram illustrating a portion of the plate-type optical member manufactured by the method of claim 13A, according to one embodiment.

Then two jigs 1302, 1308 comes into contact with the block and pushes the block in the opposite direction to mold the block into a shape as shown in FIG. 13B.

After or while pressing the block by the two jigs 1302, 1308, the block is cooled down to solidify the shape of the block into the plate-type optical member 500.

In this way, the size WO of the output ends of the optical fibers may be made larger than the size WI of the input ends of the optical fibers, as illustrated for example, with reference to FIG. 7B. Moreover, the output surfaces of the light conduits at the right edges are shifted towards the right side relative to input surfaces of the subset of the light conduits. When junction lines of the display devices are placed below the right side of the block 500, the light from active areas of the display devices are transmitted via the optical fibers over non-active areas of the display devices.

As described above, in the multi-panel display device in which plural individual display devices are joined, it is possible to guarantee image continuity in the panel junction areas by disposing the plate-type optical member including optical fibers, which receive light from pixels and output the light to areas covering the junction areas of the individual display devices, in front of the multi-panel display device.

The above description and the accompanying drawings exemplify the technical idea of the present invention, and various modifications and changes such as combination, separation, substitution, and alteration of configurations can be made by those skilled in the art without departing from the essential features of the invention. Accordingly, the embodiments disclosed in the invention are not to restrict the technical idea of the invention but to explain the technical idea of the invention. The technical idea of the invention is not limited to the embodiments. The scope of the invention is defined by the appended claims, and all the technical ideas within a range equivalent thereto should be construed as belonging to the scope of the invention.

What is claimed is:

1. A multi-panel display device, comprising:
a plurality of individual display devices adjoining along junction lines, each of the individual display devices include a plurality of pixels; and
an optical member on the plurality of individual display devices, the optical member having a flat profile of a thickness smaller than a length or a height of an individual display device, the optical member comprising:
a plurality of light conduits of a first refractive index, the plurality of light conduits at least including a first light conduit and a second light conduit, each light conduit of the plurality of light conduits corresponding to one pixel of the plurality of pixels, each light conduit comprising an input surface receiving light from the corresponding pixel and an output surface transmitting the received light, the input surface having an area smaller than the output surface, each light conduit of the plurality of light conduits comprising:
a first portion extending in a first direction perpendicularly to the input surface,
a second portion coupled to the first portion, the second portion extending in a second direction obliquely with respect to the first portion, the first portion of the first light conduit and the second portion of the first light conduit forming a first angle, and the first portion of the second light conduit and the second portion of the second light conduit forming a second angle different than the first angle, and
a third portion coupled to the second portion, the third portion extending in the first direction; and
a resin support, the resin support disposed at least over a non-display area of the plurality of display devices, the resin support having a first surface extending in the first direction, and a second surface extending in the second direction, the resin support having a refractive index lower than the first refractive index.

2. The multi-panel display device of claim 1, wherein a subset of the light conduits having output surfaces shifted towards the junction lines relative to input surfaces of the subset of the light conduits to transmit light over non-active areas of the display devices.

3. The multi-panel display device of claim 1, wherein the input surfaces and the output surfaces are parallel.

4. The multi-panel display device of claim 1, wherein the optical member comprises a first area and a second area between the first area and a junction line, first light conduits in the first area extending straight in a thickness direction of the optical member, second light conduits in the second area have at least one wall slanted towards the junction lines.

5. The multi-panel display device of claim 4, wherein an input surface of each of the first light conduits has a same area as an output surface of each of the first light conduits, an input surface of each of the second light conduits has an area smaller than an output surface of each of the second light conduits.

6. The multi-panel display device of claim 5, wherein a first output surface of a second light conduit closer to a junction line than a second output surface of another second light conduit has an area larger than the second output surface.

7. The multi-panel display device of claim 1, wherein the optical member further comprises cladding portions surrounding the light conduits, the cladding portions having a second refractive index lower than the first refractive index, the cladding portions comprising beads configured to absorb lights transmitted via the cladding portions, and wherein the multi-panel display device further comprises supporting material configured to surround and support the light conduits and the cladding portions, the supporting material having a third refractive index lower than the first refractive index and the second refractive index.

8. The multi-panel display device of claim 7, wherein the light conduits and the cladding portions are light fibers.

9. The multi-panel display device of claim 1, wherein each of the light conduits have a cross section shape of a convex polygon.

10. An optical member for multi-panel display device, comprising:
a plurality of light conduits of a first refractive index, the plurality of light conduits at least including a first light conduit and a second light conduit, each light conduit of the plurality of light conduits corresponding to one pixel of a display device, each light conduit comprising an input surface receiving lights from a corresponding pixel and an output surface transmitting the received light, the input surface having an area smaller than the output surface, a subset of the light conduits having the output surface shifted towards junction lines adjoining a plurality of individual display devices, relative to the input surface of the subset of the light conduits to transmit light over non-active areas of the display devices, each light conduit of the subset of light conduits comprising:
a first portion extending in a first direction perpendicularly to the input surface,
a second portion coupled to the first portion, the second portion extending in a second direction obliquely with respect to the first portion, the first portion of the first light conduit and the second portion of the first light conduit forming a first angle, and the first portion of the second light conduit and the second portion of the second light conduit forming a second angle different than the first angle, and
a third portion coupled to the second portion, the third portion extending in the first direction; and
a resin support, the resin support disposed at least over a non-display area of the plurality of display devices, the resin support having a first surface extending in the first direction, and a second surface extending in the second direction, the resin support having a refractive index lower than the first refractive index.

11. The optical member of claim 10, wherein the input surfaces and the output surfaces are parallel.

12. The optical member of claim 10, wherein the optical member comprises a first area and a second area between the first area and a junction line, first light conduits in the first area extending straight in a thickness direction of the optical member, second light conduits in the second area have at least one wall slanted towards the junction lines.

13. The optical member of claim 12, wherein an input surface of each of the first light conduits has a same area as an output surface of each of the first light conduits, an input surface of each of the second light conduits has an area smaller than an output surface of each of the second light conduits.

14. The optical member of claim 13, wherein a first output surface of a second light conduit closer to a junction line than a second output surface of another second light conduit has an area larger than the second output surface.

15. The optical member of claim 10, further comprising:
cladding portions surrounding the light conduits, the cladding portions having a second refractive index lower than the first refractive index, the cladding portions comprising beads configured to absorb lights transmitted via the cladding portions; and
supporting material configured to surround and support the light conduits and the cladding portions, the supporting material having a third refractive index lower than the first refractive index and the second refractive index.

16. The optical member of claim 10, wherein each of the light conduits have a cross section shape of a convex polygon.

17. The optical member of claim 15, wherein the light conduits and the cladding portions are light fibers.

18. The optical member of claim 10, wherein the optical member has a flat profile of a thickness smaller than a length or a height of each of the display devices.

19. The multiple-panel display device of claim 1, further comprising:
cladding portions surrounding the light conduits, the cladding portions having a second refractive index lower than the first refractive index, the cladding portions comprising beads configured to absorb lights transmitted via the cladding portions.

20. The optical member of claim 10, further comprising:
cladding portions surrounding the light conduits, the cladding portions having a second refractive index lower than the first refractive index, the cladding portions comprising beads configured to absorb lights transmitted via the cladding portions.

* * * * *